United States Patent [19]
Black

[11] Patent Number: 6,027,013
[45] Date of Patent: *Feb. 22, 2000

[54] INTEGRATED FOLDER AND RETAINING POCKET

[75] Inventor: Steven Charles Black, Hastings, Minn.

[73] Assignee: Smead Manufacturing Company, Hastings, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/787,137

[22] Filed: Jan. 22, 1997

[51] Int. Cl.[7] .................................................. B65D 27/00
[52] U.S. Cl. .......................... 229/67.1; 229/72; 206/308.3
[58] Field of Search ............................... 229/67.1, 72, 71; 206/308.1, 308.3, 307

[56] References Cited

U.S. PATENT DOCUMENTS

| | | | |
|---|---|---|---|
| 2,568,941 | 9/1951 | Benson | 229/72 |
| 3,351,268 | 11/1967 | Schroeder | 229/72 |
| 3,528,602 | 9/1970 | Ritchie | 229/67.1 |
| 3,655,119 | 4/1972 | Thompson | 229/72 |
| 3,847,195 | 11/1974 | Tyrseck | 229/72 X |
| 4,636,179 | 1/1987 | Gentile et al. | 229/72 X |
| 5,141,485 | 8/1992 | Welt | 229/72 X |
| 5,199,743 | 4/1993 | Rosinski, III | 206/308.3 X |
| 5,255,779 | 10/1993 | Koenig, III | 206/308.3 X |
| 5,393,157 | 2/1995 | Basmajian | 206/308.3 X |
| 5,501,540 | 3/1996 | Ho | 206/308.1 X |
| 5,730,284 | 3/1998 | Farrah | 206/307 X |

FOREIGN PATENT DOCUMENTS

| | | | |
|---|---|---|---|
| 626692 | 11/1994 | European Pat. Off. | 206/307 |
| 7810440 | 4/1980 | Norway | 229/72 |

OTHER PUBLICATIONS

"Slash Jackets" by Wilson Jones brochure (1 page) No Date.
Sample of Slash Jacket folder and retaining pocket marked as "Exhibit A". No Date.

*Primary Examiner*—Jes F. Pascua
*Attorney, Agent, or Firm*—Altera Law Group

[57] ABSTRACT

A slash jacket for holding an article on the front cover is provided, where the article is held in a retaining pocket in a lower portion of the front cover. The retaining pocket is formed by a single cut on the front cover and communicates to the inside of the slash jacket. The retaining pocket is formed by a simple cutting process step at the time of manufacturing the form from which the slash jacket is fabricated. The slash jacket may also include a retaining tab on the front cover for retaining the article held in the pocket. The pocket is preferably cut so as to prevent the upper lip of the first cut from catching on any portion of the object inserted therein. Additional features of the slash jacket include an index tab along the side of the slash jacket, and tick marks to secure the die cut flaps forming the pocket and securing tab. The upper portion of the front cover may be cut to be parallel with the top edge of the back cover, so as to expose a greater portion of any documents contained therein.

16 Claims, 5 Drawing Sheets

INTEGRATED FOLDER AND RETAINING POCKET

BACKGROUND OF THE INVENTION

1. Field of the Invention

This invention relates in general to office supplies and, in particular, to an integrated folder and retaining pocket for holding papers and additional articles.

2. Description of Related Art

Office requisites, such as folders and pocket folders are widely used office supplies for holding letters and other documents. The traditional pocket folder is a paper or card enclosure having front and rear covers joined along the bottom edge and along portions of the right and left edges. These are sometimes referred to as slash jackets. The front cover generally has a cutaway providing easy access to documents contained within the folder. The cutaway may slope from the top left corner to a point lower on the right side of the folder to allow a user to see part of the letter contained therein. The cutaway may alternatively slope from the top right corner to a point lower on the left side, or may be a decoratively curved diagonal cut or the like. Recent developments in office practices include providing the ability to hold other items in addition to the paper documents. For example, it may be desirable to attach a computer diskette, a media storage device, or a business card, photograph, or the like to the front cover of the slash jacket to supplement the contents of the documents contained in the slash jacket.

A known approach to holding a standard 3½ inch computer diskette on the front cover of a slash jacket includes cutting an aperture on the front cover and attaching an additional piece of cardboard material to the inner surface of the front cover so as to form an enclosed pocket for holding the diskette.

A problem with this approach is that it requires the additional manufacturing steps of cutting and removing material to form the slot, and attaching an additional piece of material to the inner surface of the front cover to form an enclosed pocket. These additional steps increase the cost of manufacturing the slash jacket.

There is therefore a need to provide a slash jacket which can hold items in addition to the documents contained within the jacket, such as computer diskettes, etc., which requires fewer manufacturing steps than the known art, and which is therefore easier and less expensive to manufacture.

SUMMARY OF THE INVENTION

To minimize the limitations in the prior art described above, and to minimize other limitations that will become apparent upon reading and understanding the present specification, the present invention is an integrated folder for holding an article on the front cover, where the article is held in a pocket in a lower portion of the front cover. The pocket communicates to the inside of the folder and is formed by a cut, or a series of cuts, in the front cover. Since the pocket is simply formed by one cut, the manufacturing steps for forming the pocket are much simpler than for the prior art.

Additional features of the invention include a retaining tab on the front cover for retaining the article held in the pocket. The pocket may be cut so as to prevent the upper lip of the first cut from catching on an element on the article retained in the pocket. For example, if the pocket retains a standard 3½ inch diskette, the pocket may be cut to be below the protective sliding portion of the diskette so as to avoid catching the sliding portion. Additionally, the pocket may be cut to expose a large area of the retained article. For example, the pocket may be cut to expose the label of a 3½ inch diskette.

Other features of the folder or pocket folder include an index tab along the side of the folder, and tick marks to secure the die cut flaps forming the pocket and securing tab. Furthermore, the upper portion of the front cover may be cut to be parallel with the top edge of the back cover, so as to expose a greater portion of any documents contained therein.

BRIEF DESCRIPTION OF THE DRAWINGS

Referring now to the drawings in which like reference numbers represent corresponding parts throughout.

DETAILED DESCRIPTION OF THE ILLUSTRATED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
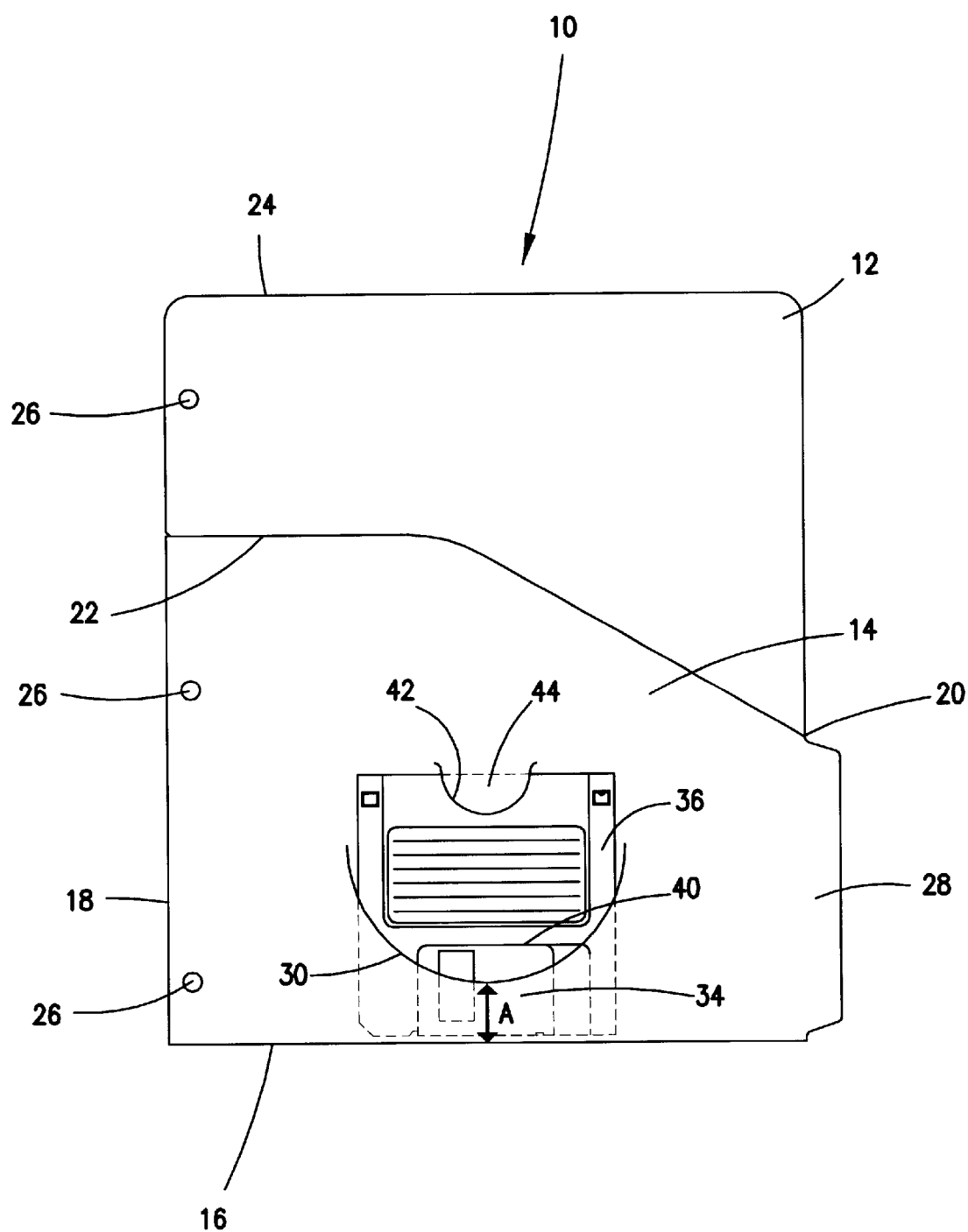
FIG. 1 is a schematic of the folder according to the present invention.

Folders and pocket folders (also known as slash jackets) are commonplace items in offices. Developments in office practice require that other items, such as computer diskettes and other media storage devices, business cards, brochures, promotional materials, photographs and the like be attached to the folder in a manner so that the user may easily identify the attached item. FIG. 1 illustrates such a folder in the form of a slash jacket 10. Of course, the invention may be implemented in other types of folder or in other office products having front and back covers. Without implying any limitation to the invention, the invention is described below in the context of implementation on a slash jacket.

The slash jacket has an essentially rectangular rear cover 12 and a front cover 14. The front cover 14 is attached to the rear cover 12 along a portion of the bottom edge 16. The portion of the bottom edge 16 at which the front and rear covers 14 and 12 are attached is known as the attaching portion. The slash jacket 10 is also attached along portions of the left edge 18 and right edge 20. The front cover 14 covers only the lower part of the rear cover 12 so that the top portions of any documents contained within the slash jacket 10, such as letters on letterhead, are visible to the user without having to remove the documents from the slash jacket 10. The connection between the front and rear covers 14 and 12 on the right edge 20 is preferably shorter in length than the connection along the left edge 18, so as to increase the ease with which documents may be inserted into the slash jacket 10. The front cover 14 preferably has a portion of its upper edge 22 parallel with the top edge 24 of the rear cover. This feature enables the user to easily identify, for example, an address positioned on the left-hand side of a letter inserted in the slash jacket 10. Such an advantage is not available in the prior art.

The slash jacket 10 may also be provided with holes 26 punched along an edge, for example, for a standard three-ring binder. The slash jacket may also be provided with an index tab 28 along a portion of the right edge 20. Such an index tab 28 may be provided on the upper portion of the right edge 20 where the rear cover 12 is not attached to the front cover 14, or may be provided on the lower portion of the right edge 20 where the front and rear covers 12 and 14 are attached, as illustrated in FIG. 1.

A first cut 30 on the front cover produces an upper lip 32 and lower lip 34. The first cut 30 may preferably be a simple die-cut line, produced at the same time as the form 38, from which the slash jacket 10 is to be manufactured, is shaped. The first cut 30 is cut to be sufficiently wide so that an article may pass therethrough. For example, as shown in FIG. 1, a standard 3½ inch diskette 36 may be inserted through the first cut 30 so as to be retained in the pocket formed by the first cut 30. The diskette 36 preferably rests on the attaching portion of the bottom edge 16, inside the slash jacket 10.

If the article to be retained in the pocket contains an element which may catch on the upper lip 32 when being removed from the pocket, then the first cut 30 is preferably formed so that the distance A, between the first cut 30 and the bottom edge 16, is less than the separation between that element and the bottom edge 16. In this manner, the article may be released from the pocket without catching on the element and possibly causing damage. For example, where the article to be retained is a 3½ inch diskette 36, the slidable disk protector 40 may catch on the upper lip 32 when the diskette 36 is removed unless the first cut 30 is formed so that the upper lip 32 is below the upper edge of the protector 40. Such positioning of the upper lip 32 reduces the possibility that the upper lip 32 interferes with the protector 40 when the diskette is extracted from the pocket. For a folder which retains a 3½ inch diskette, the distance A, between that portion of the upper lip 32 in the region of the protector 40 and the bottom edge, is preferably less than about 1⅜ inches. Thus, the diskette 36 may easily be released from the pocket without damaging the protector 40 or the upper lip 32.

A second cut 42 may be provided so that the first cut 30 lies between the second cut 42 and the bottom edge 16. The second cut is preferably shaped to form a retaining tab 44 so that the item to be inserted into the first cut 30 may fit under the retaining tab 44 so as to prevent unwanted movement of the retained item by holding the item between the bottom edge 16 and the retaining tab 44. Where a 3½ inch diskette 36 is retained in the slash jacket 10, the retaining tab 44 is preferably located in a position central relative to the first cut 30, and is spaced from the bottom edge 16 by at least 3½ inches in order to accept the 3½ inch diskette 36.

Of course, it is understood that more than one such retaining tab 44 may be provided by forming a plurality of second cuts 42.

Figure 2:
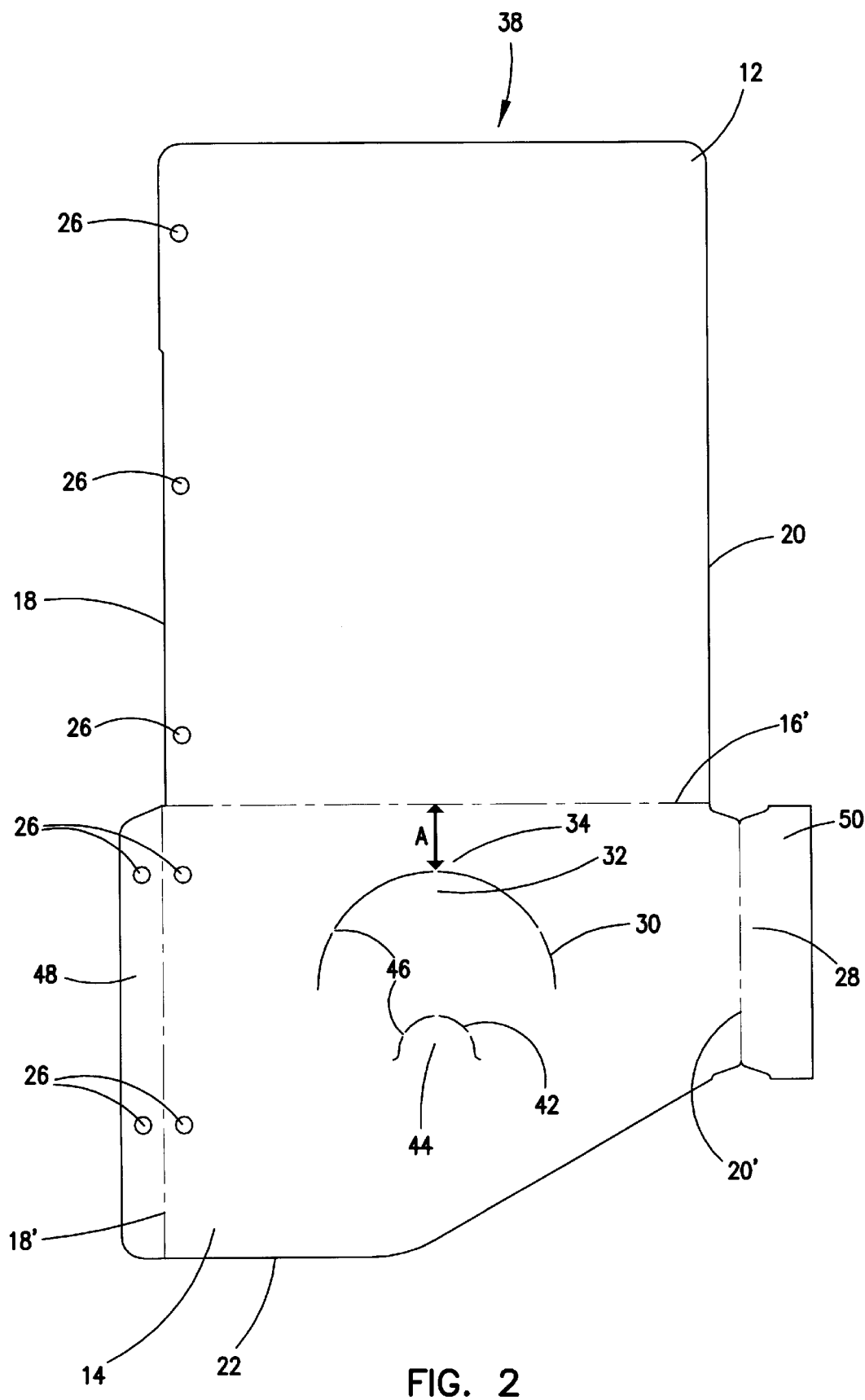
FIG. 2 is a schematic of a pre-shaped form for assembling the folder of the present invention.

FIG. 2 illustrates an example of a precut form 38 from which the slash jacket 10 illustrated in FIG. 1 may be fabricated. The form 38 is die-cut from a blank sheet of pliable material, preferably card, heavy paper, plastic, a laminate, or other like material. The step of die-cutting cuts the exterior shape of the form 38 and also provides the first and second cuts 30 and 42. Assembly includes forming a first fold 16' along what will become the bottom edge 16 so that the front cover 14 is in contact with the rear cover 12.

Flaps 48 and 50 are provided on the left and right sides respectively for folding along lines 18' and 20' and attached to the rear cover 12 to form the slash jacket. The first and second cuts 30 and 42 may be provided with tick-marks 46 at spaced intervals to secure the first and second cuts 30 and 42 until they are required by a user, at which time the tick-marks 46 may be broken so as to open the respective cut. Alternatively, the form 38 may be cut so that the front cover 14 and rear cover 12 are attached at a folded edge along the right edge 20 or left edge 18. Thus, the bottom edge 18 would be formed by a fold between the front cover and a flap which is folded and attached to the rear cover 12.

Figure 3:
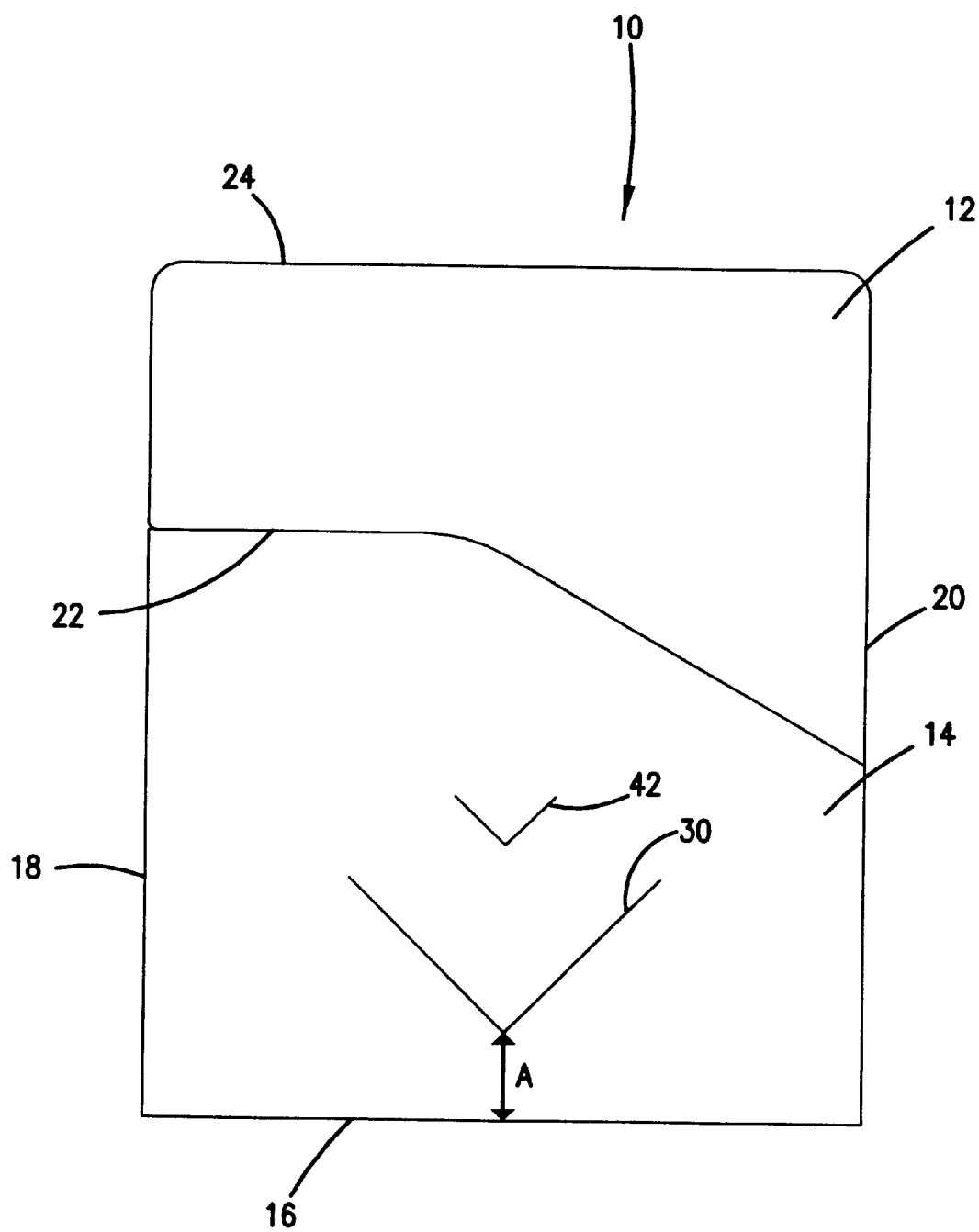
FIG. 3 is a schematic of a folder having a first alternative shape for the first and second cuts.
Figure 4:
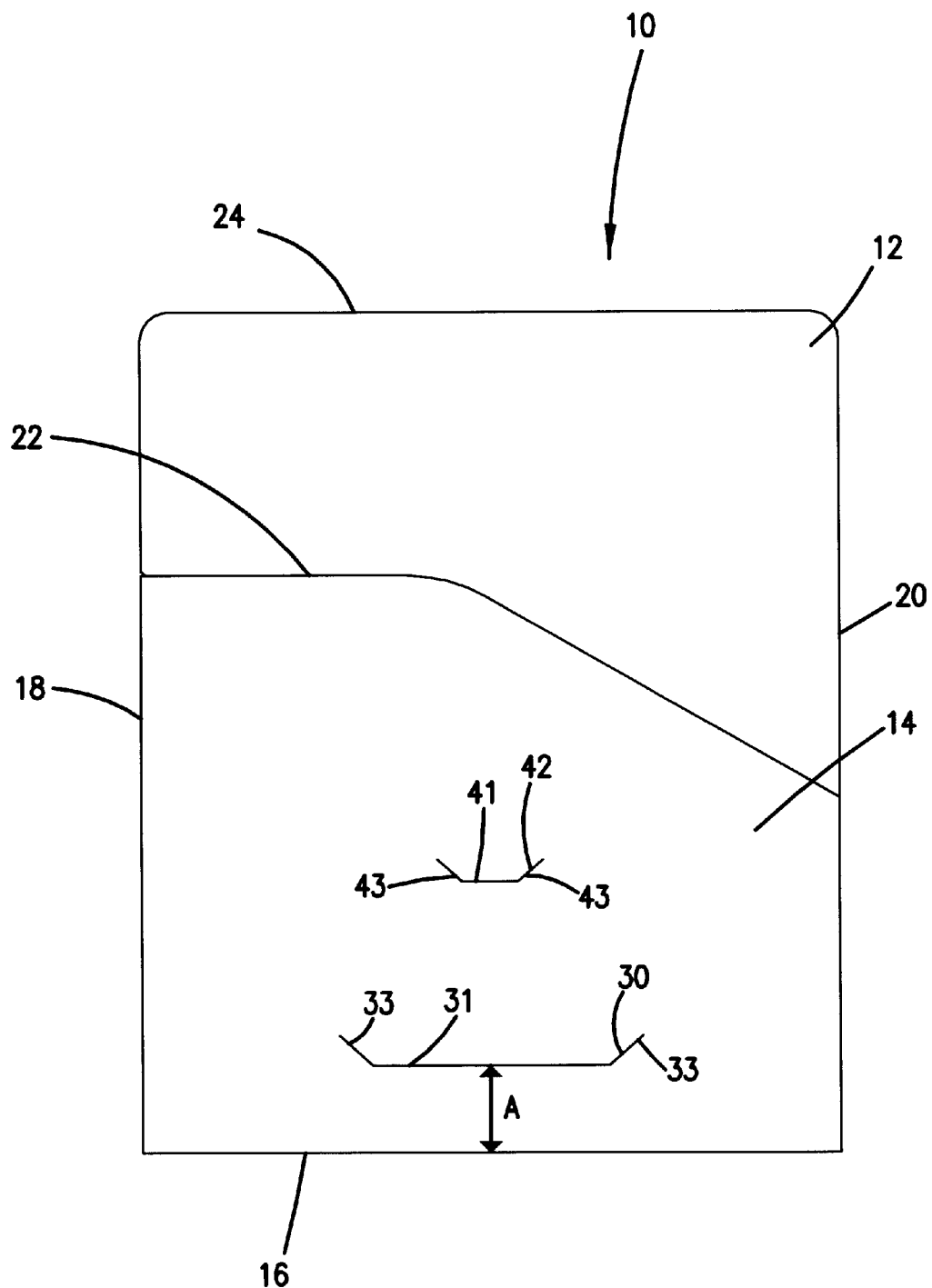
FIG. 4 is a schematic of a folder having a second alternative shape for the first and second cuts.

The first and second cuts 30 and 42 need not be arcuate, but may be of different geometries. For example, as illustrated in FIG. 3, the first and second cuts 30 and 42 may be formed from two straight lines to produce a triangular upper lip 32 or, as illustrated in FIG. 4, may be formed so as to have central cut portions 31 and 41 respectively, intermediate sloping end cut portions 33 and 43 respectively. Irrespective of the shapes of the first and second cuts 30 and 42, it is preferable that dimension A is such that the upper lip 32 lies lower than any catchable elements on the article retained in the pocket so as to prevent the upper lip 32 catching on the element when extracting the article.

Figure 5:
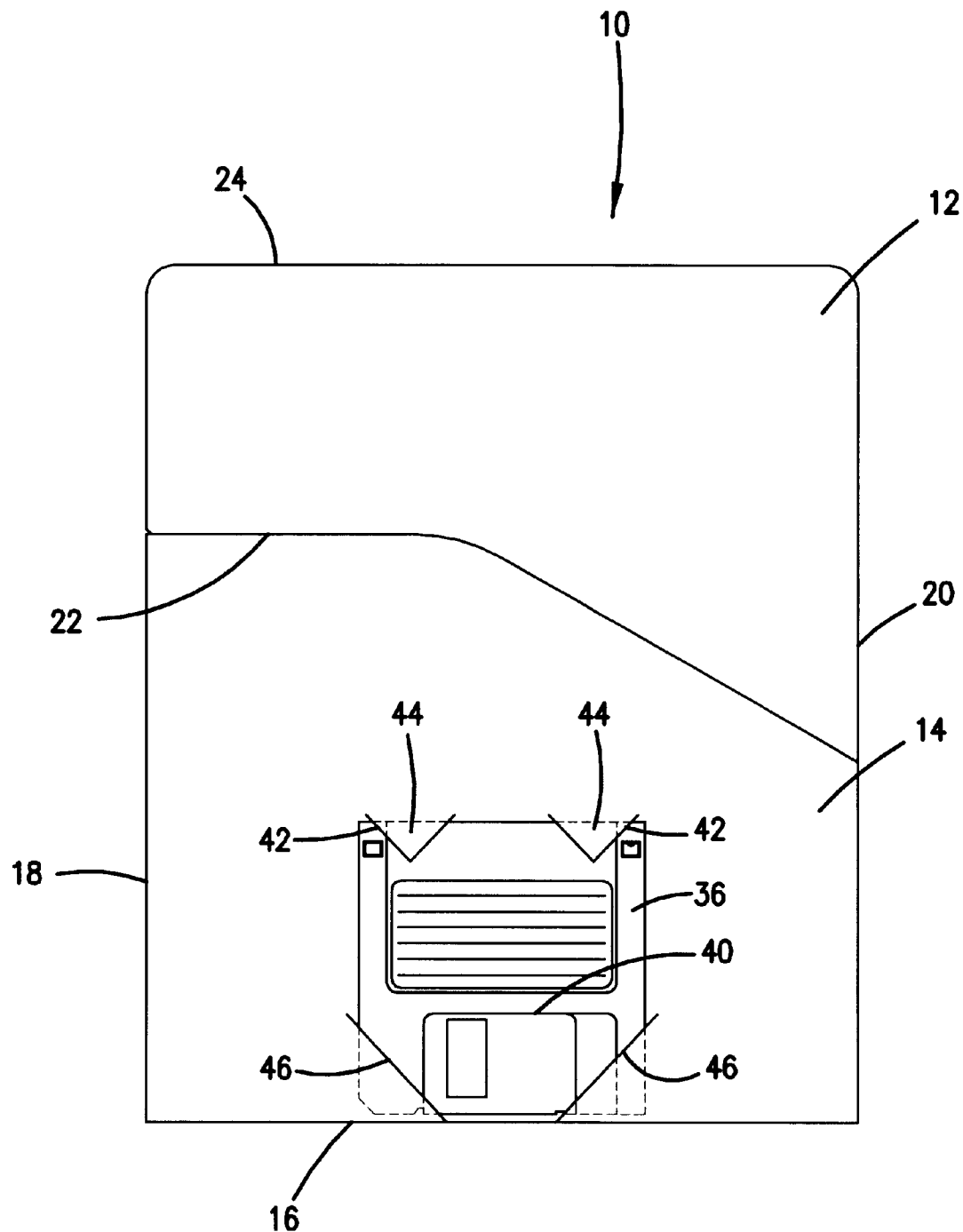
FIG. 5 illustrates an alternative embodiment of the invention.

An alternative embodiment illustrated in FIG. 5 shows a slash jacket 10 where two separate first cuts 46 extend down to the bottom edge 16 to form openings which receive the lower corners of the 3½ inch diskette 36. Since the separate first cuts 46 extend to the bottom edge 16, the corner portions of the diskette 36 received through the separate first cuts 46 sit on the inside of the bottom edge 16. If the separate first cuts 46 were not to extend to the bottom edge 16, only the separate first cuts 46 would provide support for the diskette 36 and they would be in danger of tearing under the strain. The slash jacket 10 is illustrated to have two tabs 44, although fewer or more than two tabs may be used.

In summary, a folder has been described which provides a retaining pocket for holding articles, such as diskettes, media storage devices, photographs, business cards, etc., in addition to the documents contained within the folder. The pocket for retaining the articles is easily manufactured using a die-cutting step which may take place simultaneously with manufacture of the form from which the folder is to be made. The pocket for retaining articles does not require the addition of extra material over and above that used for the form of the folder, thus reducing the number of manufacturing steps required.

The foregoing description of the preferred embodiment of the invention has been presented for the purposes of illustration and description. It is not intended to be exhaustive or to limit the invention to the precise form disclosed. Many modifications and variations are possible in light of the above teaching. For example, the retaining pocket is not required to be positioned along a bottom edge of the folder, and may be positioned along a different edge. It is intended that the scope of the invention be limited not by this detailed description, but rather by the claims appended hereto.

What is claimed is:

1. A folder, comprising:

a rear cover;

a front cover attached to the rear cover at an attaching portion of a folder edge, the front cover having a first cut communicating with inside the folder so as to form a pocket with the attaching portion inside the folder, the first cut positioned between an upper lip and the folder edge;

an article, having an engageable element on a surface thereof facing the upper lip, locatable in the pocket, the upper lip being closer to the folder edge than the engageable element when the article is located in the pocket and resting against the folder edge.

2. The folder of claim 1, wherein the at least one first cut extends to the folder edge so that a portion of the article received therethrough rests on the attaching portion inside the folder.

3. The folder of claim 1, further comprising at least one retaining tab on the front cover, the at least one retaining tab formed by at least one second cut on a side of the at least one first cut away from the folder edge, so as to hold the article between the at least one retaining tab and the attaching portion inside the folder.

4. The folder of claim 3, wherein the retaining tab is spaced away from the attaching portion by at least approximately 3½ inches.

5. The folder of claim 1, further comprising an upper lip of the at least one first cut separated from the folder edge by a distance of less than approximately 1⅜ inches.

6. The folder of claim 1, further comprising tick marks on the at least one first cut so as to prevent the at least one first cut from opening until intentionally opened by a user.

7. The folder of claim 1, wherein the front cover further comprises a top edge, at least a portion of the top edge being parallel to a top edge of the rear cover.

8. The folder of claim 1, wherein the folder edge comprises a fold between the front cover and the rear cover.

9. The folder of claim 1, further comprising an index tab provided along a side of the folder.

10. A folder, comprising:

a rear cover;

a front cover attached to the rear cover at an attaching portion of a folder edge, the front cover having a first cut communicating with inside the folder so as to form a pocket with the attaching portion inside the folder, the at least one first cut extending to the folder edge so that a portion of the article received therethrough rests on the attaching portion inside the folder;

an article, having an engageable element on a surface thereof, locatable in the pocket, the first cut comprising an upper lip closer to the folder edge than the engageable element when the article is located in the pocket and resting against the folder edge.

11. The folder of claim 10, further comprising at least one retaining tab on the front cover, the at least one retaining tab formed by at least one second cut on a side of the at least one first cut away from the folder edge, so as to hold the article between the at least one retaining tab and the attaching portion inside the folder.

12. The folder of claim 10, further comprising an upper lip of the at least one first cut separated from the folder edge by a distance of less than approximately 1⅜ inches.

13. The folder of claim 10, further comprising tick marks on the at least one first cut so as to prevent the at least one first cut from opening until intentionally opened by a user.

14. The folder of claim 10, wherein the front cover further comprises a top edge, at least a portion of the top edge being parallel to a top edge of the rear cover.

15. The folder of claim 10, wherein the folder edge comprises a fold between the front cover and the rear cover.

16. The folder of claim 10, further comprising an index tab provided along a side of the folder.

* * * * *